Sept. 20, 1971   V. R. WANNER   3,605,140
PORTABLE BUNK TENT AND BUNK TENT COMBINATION
Filed March 10, 1969   14 Sheets-Sheet 1
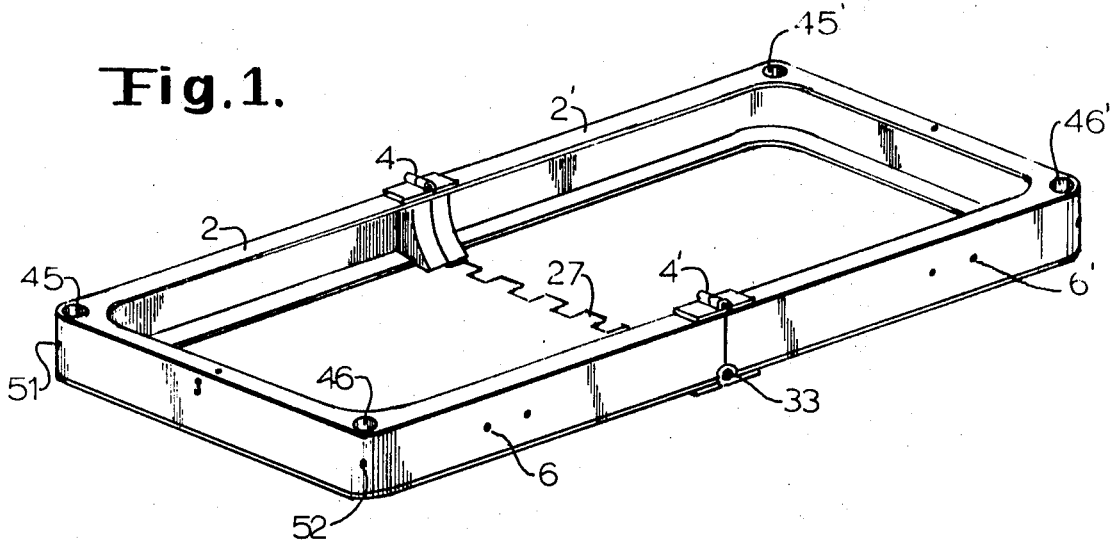
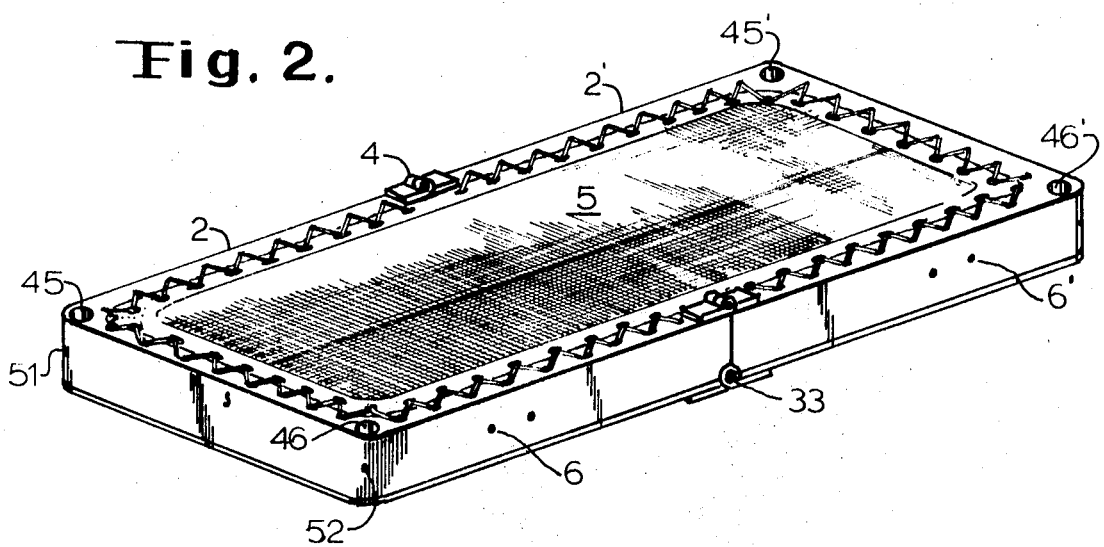
INVENTOR.
Vance R Wanner
BY
Thomas P Sarro INVENTOR.
Vance R. Wanner
BY
Thomas P. Sarro

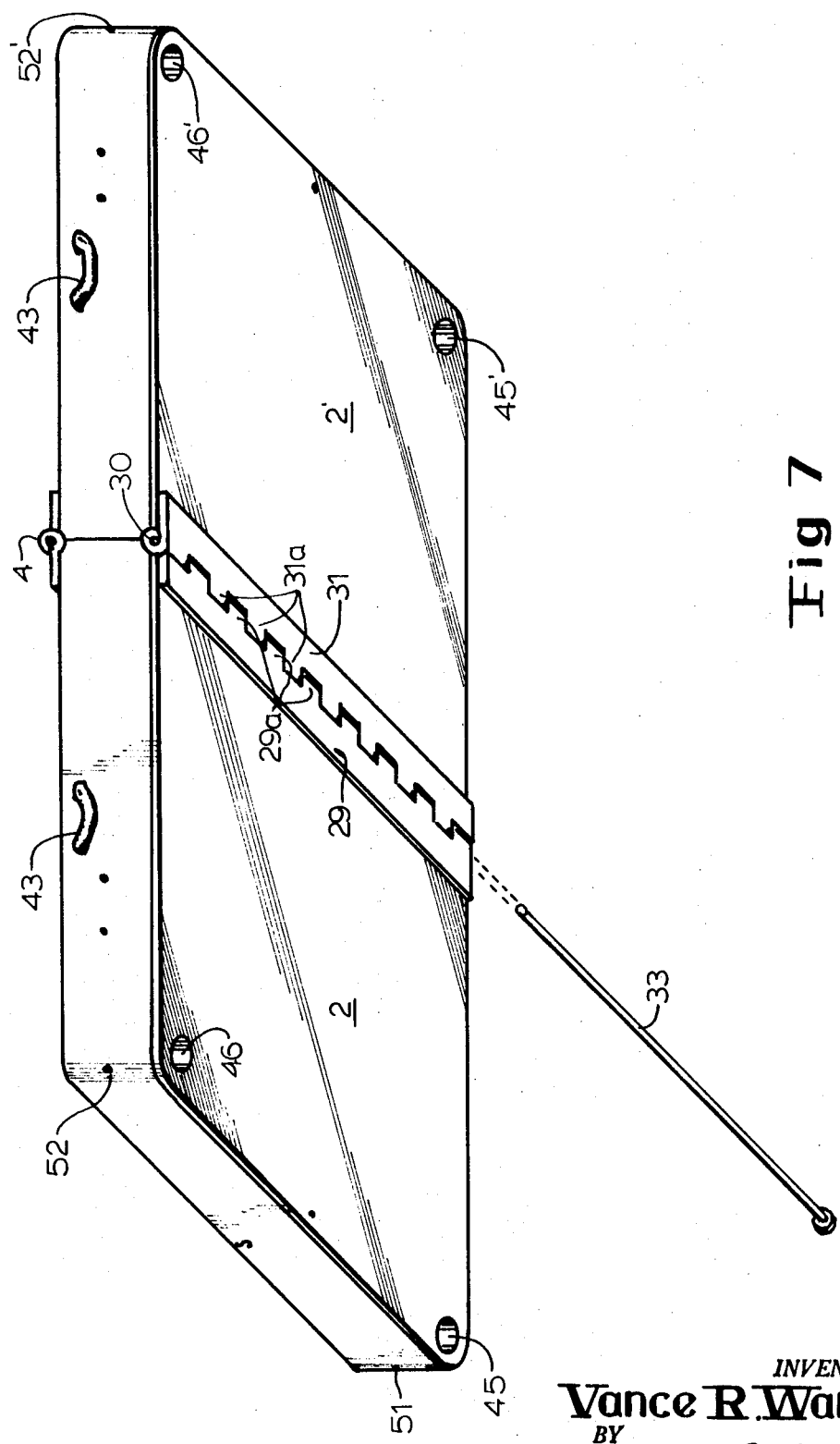

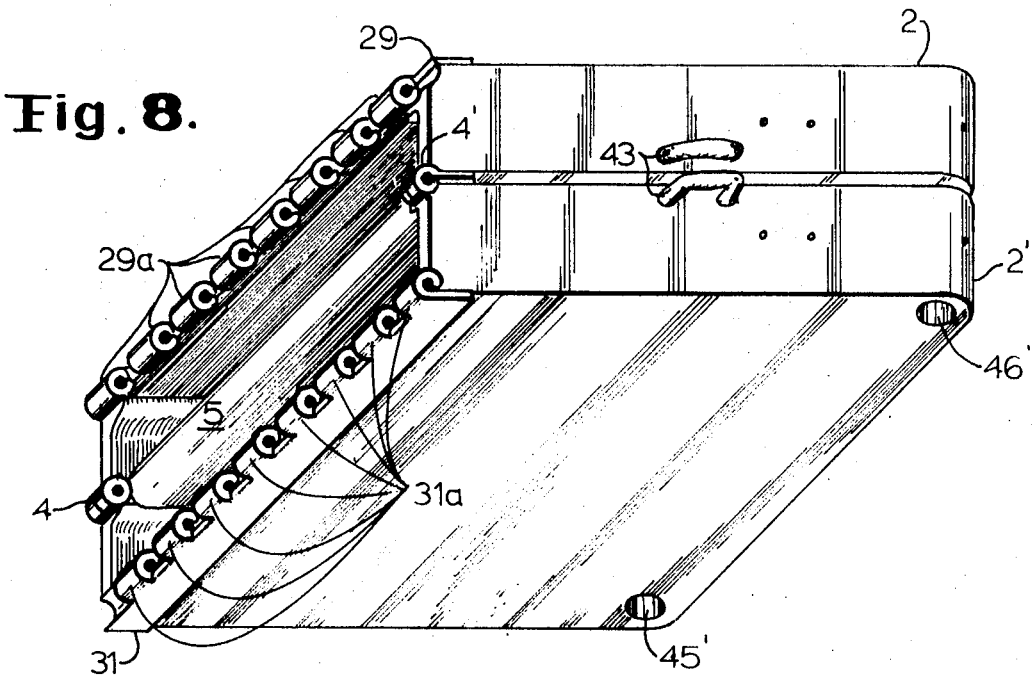
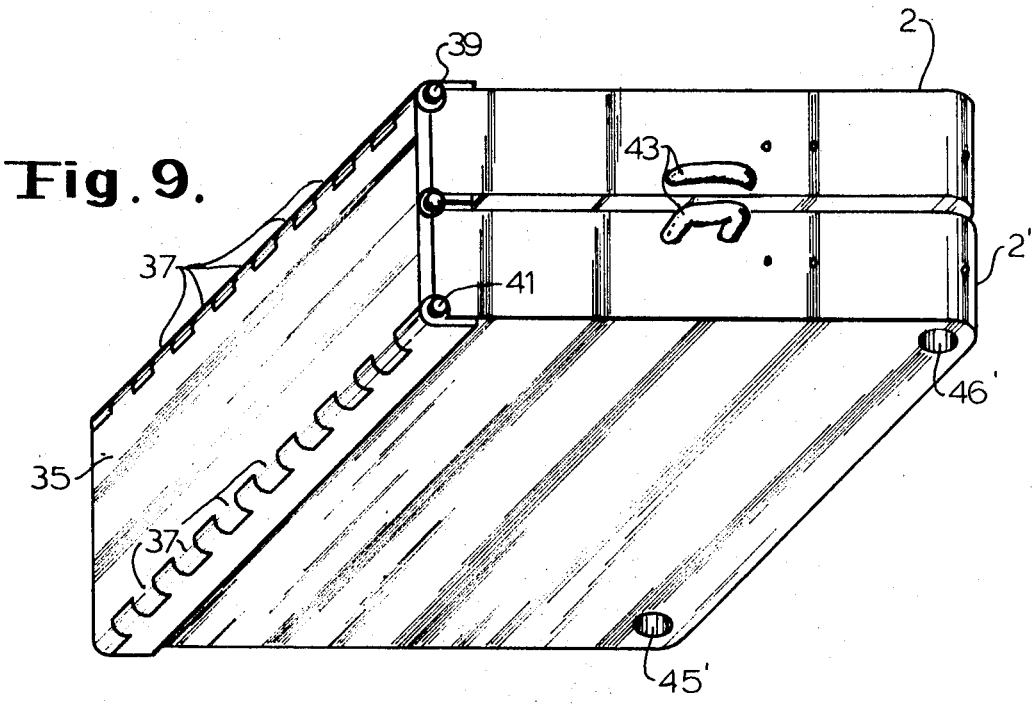

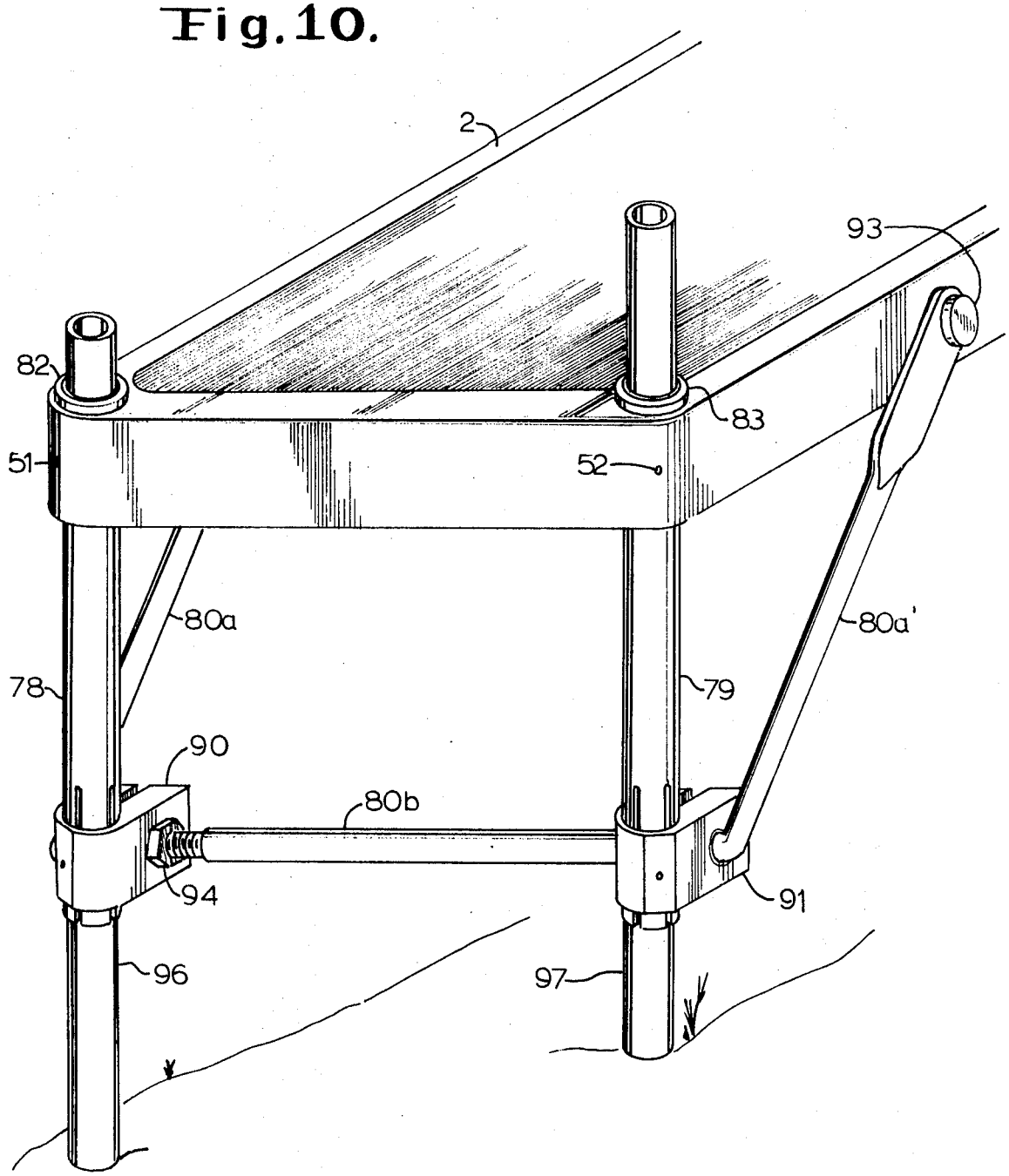

Sept. 20, 1971 V. R. WANNER 3,605,140
PORTABLE BUNK TENT AND BUNK TENT COMBINATION
Filed March 10, 1969 14 Sheets-Sheet 6

INVENTOR.
Vance R. Wanner
BY
Thomas P. Sarro

Sept. 20, 1971  V. R. WANNER  3,605,140
PORTABLE BUNK TENT AND BUNK TENT COMBINATION
Filed March 10, 1969  14 Sheets-Sheet 7
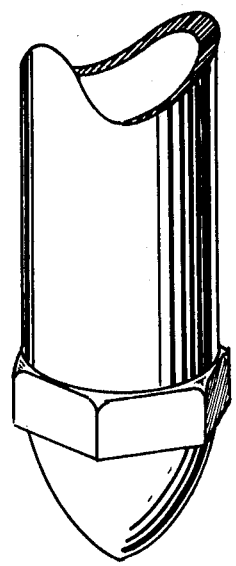
Fig. 12.
Fig. 13.
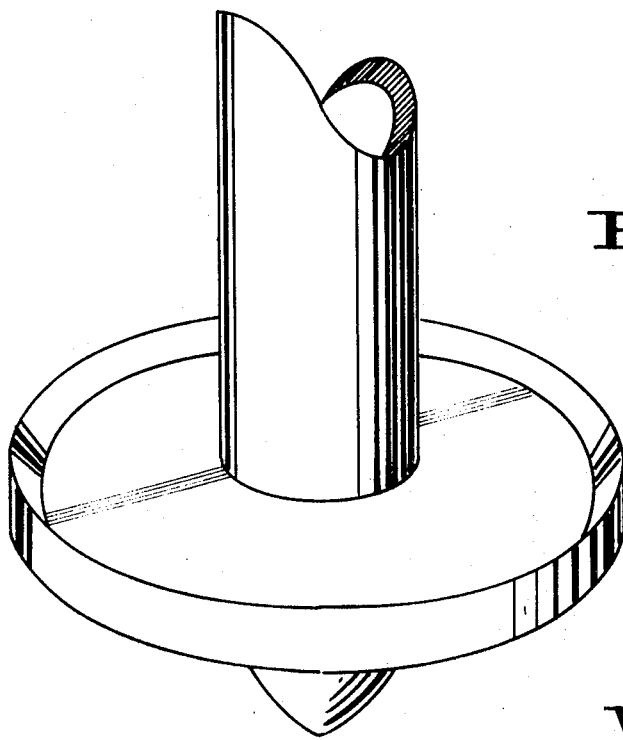
INVENTOR.
Vance R. Wanner
BY
Thomas P. Sarro INVENTOR.
Vance R Wanner
BY
Thomas P. Sarro Sept. 20, 1971  V. R. WANNER  3,605,140
PORTABLE BUNK TENT AND BUNK TENT COMBINATION
Filed March 10, 1969  14 Sheets-Sheet 9
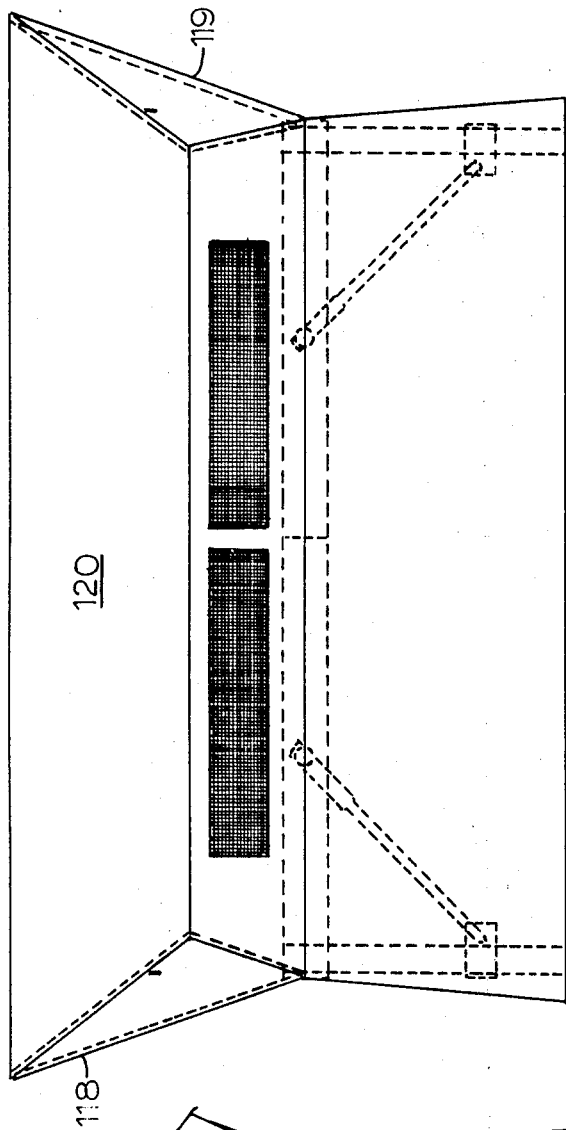
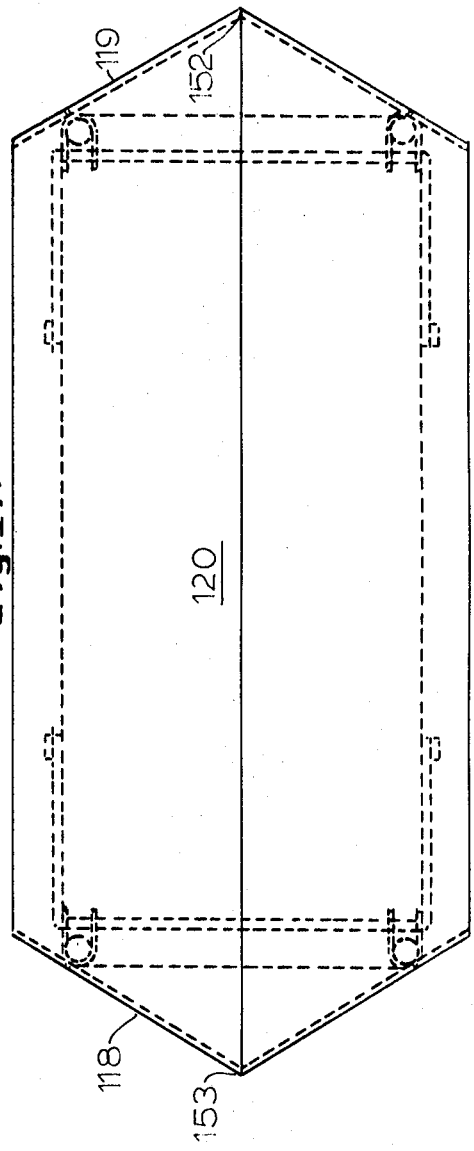
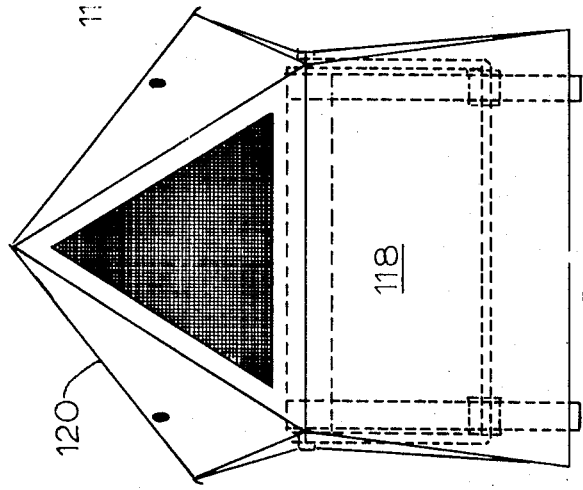
INVENTOR.
Vance R. Wanner
BY
Thomas P. Sarro Sept. 20, 1971 V. R. WANNER 3,605,140
PORTABLE BUNK TENT AND BUNK TENT COMBINATION
Filed March 10, 1969 14 Sheets-Sheet 12

INVENTOR.
Vance R Wanner
BY
Thomas P. Sarro

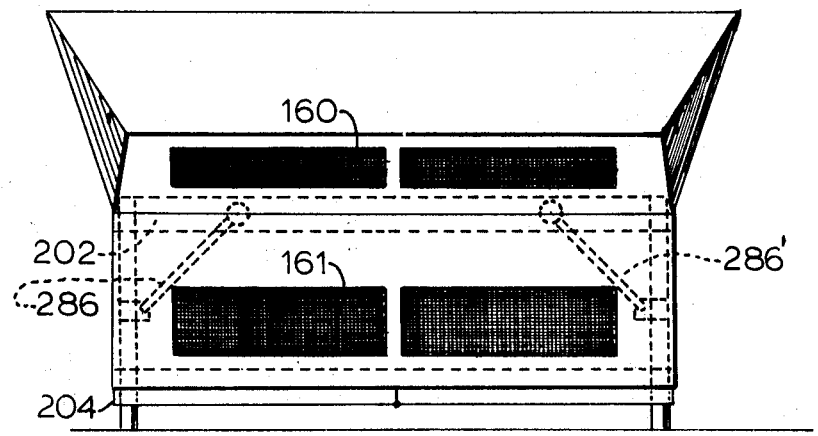
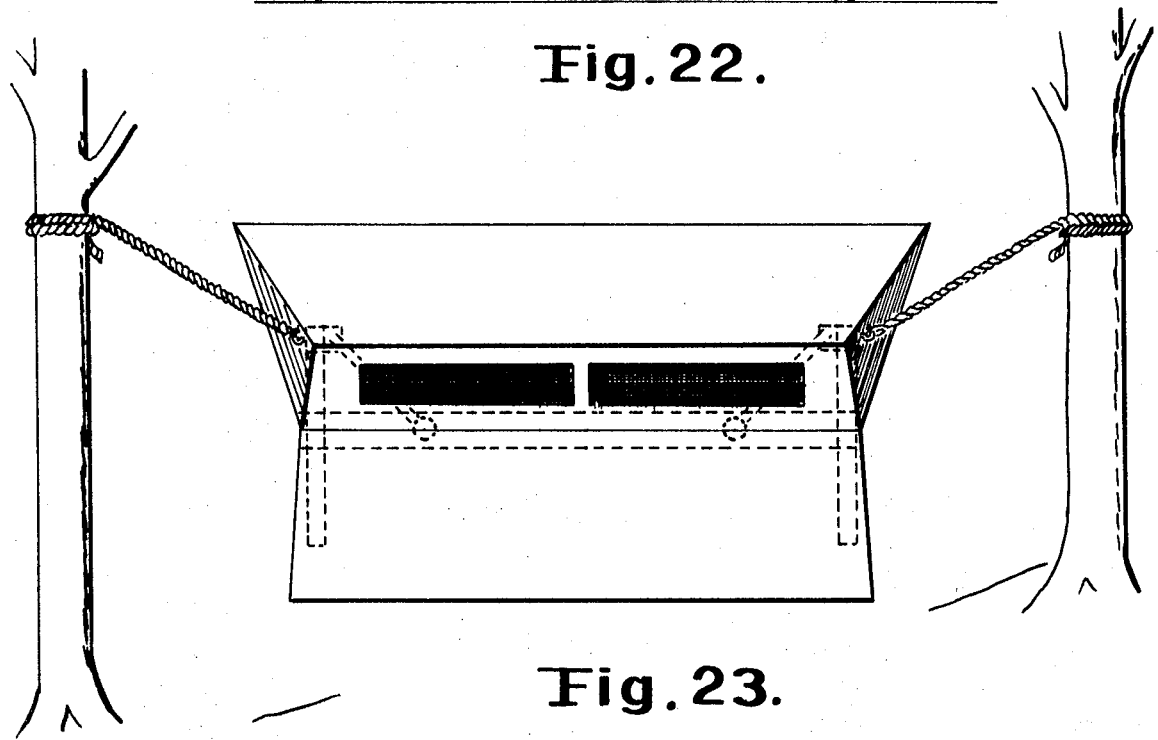

United States Patent Office 3,605,140
Patented Sept. 20, 1971

3,605,140
PORTABLE BUNK TENT AND BUNK TENT COMBINATION
Vance R. Wanner, 8416 Tenly St., Alexandria, Va. 22308
Filed Mar. 10, 1969, Ser. No. 805,464
Int. Cl. A47c 29/00
U.S. Cl. 5—113
14 Claims

ABSTRACT OF THE DISCLOSURE

A novel portable bunk comprising two connected box-like portions, means for folding one of the portions onto the other to form a closed case for easy transportation, means for maintaining the bunk structure in the open position, and means for four individually removable and slidably adjustable legs to enable the bunk structure to be set up on irregular or sloping terrain or suspended between vertical supports. Also included is a novel foldable tent canopy preferably designed for the above portable bunk, having standing ends for support and lacking the usual ridgepole.

The tent-bunk combination comprises a foldable bunk frame provided with slidably adjustable legs for said bunk frame and a tent canopy removably attached to said bunk frame.

---

This invention relates to a novel portable bunk and more particularly to a bunk-tent combination which can be set up evenly at a selected height on irregular or sloping terrain having hard or soft, wet or dry soil. As another embodiment, the bunk-tent combination supports as a hammock arrangement. In another embodiment, two similar portable folding bunk units may be assembled one over the other in tandem fashion on the same set of legs and under the same tent canopy. In yet another embodiment of the invention, the bunk-tent combination permits assembly of a plurality of units in a polygonal fashion to form an enclosed area for group privacy.

Existing apparatus for recreational camping includes camping trailers, tents, cots and sleeping bags all of which require prepared level terrain or campsites upon which to be established for use. Furthermore, the surface composition must be compatible (hard enough, smooth enough, dry enough) for the given apparatus. Additionally, the camping trailer, which is the most comfortable of these apparatuses, generally precludes the additional trailering of a boat, canoe, or other similar recreational item by the same automobile.

Present practice in providing for the needs of large numbers of people rendered homeless or injured in natural or civil disasters involve the use of available buildings such as schools, churches, etc., and many separately assembled items of equipment such as cots and blankets and stretchers and operating tables and the like which must be gathered together, distributed, and set up. In some cases, the available buildings for the set-up may not be safe or environmentally suitable, and because of crowding and lack of privacy, there is greater danger of spreading contagious diseases.

Current plans for civil defense in all-out nuclear warfare envision that the population will move to underground or otherwise shielded locations such as subways, basements, tunnels, sewers and the like on the sounding of the civil defense alarm. Many people in such locations may survive the blast of nuclear weapons but will face days and hours of additional confinement awaiting sufficient fallout decay for safe emergence. It is not clear that many people are capable of enduring such total absence of comfort and respite without some means for rest and privacy. Moreover, when it is safe to emerge from fallout shelters, there may be a large scale shortage of shelter and bedding facilities in usuable locations. There have been no known arrangements or equipment provided, even on a shared basis, for human habitation or rest during the period of waiting.

It is an object of this invention to provide a portable bunk which may be readily transported and set up on hill, beach, bog, field, stubble, ice, snow, rocky ground or woodland without the use of a previously prepared campsite.

It is another object of the invention to provide a novel tent canopy for a portable folding bunk.

A further object of the invention is to provide a bunk-tent combination which can be disassembled into a convenient portable case thereby permitting the transportation of other recreational devices as well.

Yet another object of the invention is to provide a bunk-tent combination that is a fully self-contained habitation unit which may be compactly stockpiled and easily transported by aircraft or other means to the scene of a disaster where the combination may serve a number of uses. In addition to serving as a home, the bunk portion without the legs may be used as a stretcher and with the legs as an emergency operating table. Thus, casualties may be assembled and treated in rapid succession without necessarily moving them from stretcher-to-operating table-to-stretcher-to-cot.

These and other objects of the invention are obtained by a foldable, portable bunk comprised of two units or portions, hinge means operably connecting the two portions into a bunk frame structure and enabling the folding of one portion onto the other, said bunk frame structure being provided with removable legs, most advantageously slidably adjustable as well. The invention also contemplates a bunk frame foldable into a portable case which comprises a first portion and a second portion, each having a base and three upright sides, hinge means operably connecting the portions into a shallow, box-like bunk frame structure and enabling folding of one of the portions onto the other, leg receiving means in said first and second portions and means for fixing or securing the shallow, box-like frame structure in open position.

In another aspect, the invention comprises a bunk-tent combination comprising a foldable bunk frame provided with slidably adjustable legs for the bunk frame and a tent canopy removably attached to said bunk frame. The tent canopy is preferably comprised of two end sections and a center section removably attached to said end sections. In a preferred embodiment, each of the tent end sections comprise a triangular middle panel flanked by two adjoining triangular panel sections suitably reinforced and adapted to be turned or angled inwardly.

The invention will be better understood by reference to the attached drawings wherein, FIG. 1 is a perspective view of the bunk frame in open position;

FIG. 2 is a perspective view of the bunk frame in open position provided with a canvas bed surface;

FIG. 7 is a perspective view of the bottom of the bunk frame in open position;

FIG. 8 is a perspective view of the bunk frame in the folded position but with the end covering plate not yet attached;

FIG. 9 is a perspective view of the bunk frame in folded position with the end covering plate attached in place;

FIG. 10 is a perspective end view of the bunk frame with one type of slidably adjustable leg system;

FIG. 12 is a perspective view of a removable leg cap particularly adapted for use on a slidably adjustable leg when the terrain is hard;

FIG. 13 is a perspective view of a removable disc cap particularly suited for use on a slidably adjustable leg when the ground is soft;

FIG. 16 is an end elevation of the bunk-tent combination;

FIG. 17 is a side elevation of the bunk-tent combination;

FIG. 18 is a plan view of the bunk-tent combination;

FIG. 22 is a side elevation of the bunk-tent combination in a tandem assembly;

FIG. 23 is a side elevation of the bunk-tent combination with suspended support;

Figure 3:
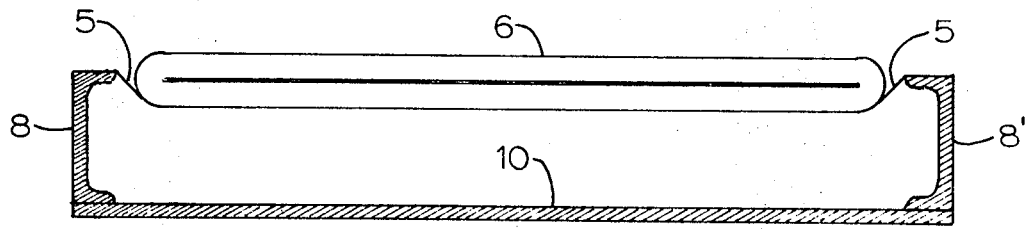
FIG. 3 is a cross-sectional view of the bunk frame of the invention provided with a canvas bed surface and a sleeping bag, the sides of said bunk frame are constructed from formed channel beams and the bottom of wood, Masonite or metal.

Referring to FIGS. 1 and 2, the folding bunk frame comprises two similar portions or units designated generally as 2 and 2' connected together by suitable hinge means 4 and 4'. The bunk frame is advantageously made in the form of a shallow, box-like structure so that one frame unit may be raised up and folded over and onto the other frame unit as shown in FIGS. 8 and 9, to form a compact storage and carrying case. The bunk frame units 2 and 2' are provided with leg sockets 45, 45', 46 and 46' for receiving four legs.

Referring to FIG. 2, a bed surface may be provided the bunk frame by firmly and snugly securing, for instance, foldable material 5 such as a fabric piece around the upper lip formed by the periphery of the open frame. Alternatively, an air mattress, foam rubber pad, or appropriate springed mattress (not shown) may be substituted in the bunk frame for the laced-in support means shown in FIG. 2. If desired, a sleeping bag 6 (see FIGS. 3–6) may be placed on the bed surface and secured by means of zippers, snaps or the like wastening means.

Figure 4:
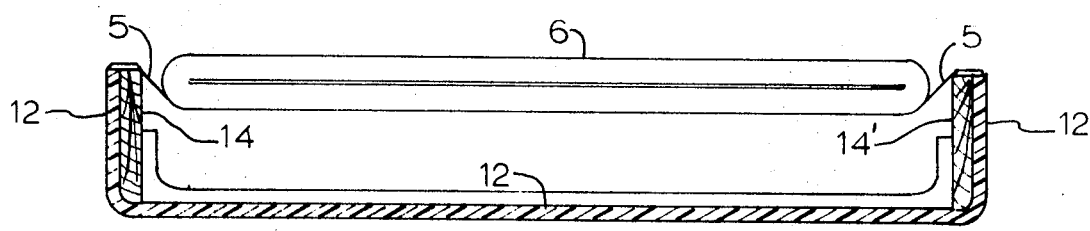
FIG. 4 is a cross-sectional view of the bunk frame equipped as in FIG. 3 wherein the bunk frame sides are fabricated of fiber glass reinforced with wood and/or metal.
Figure 5:
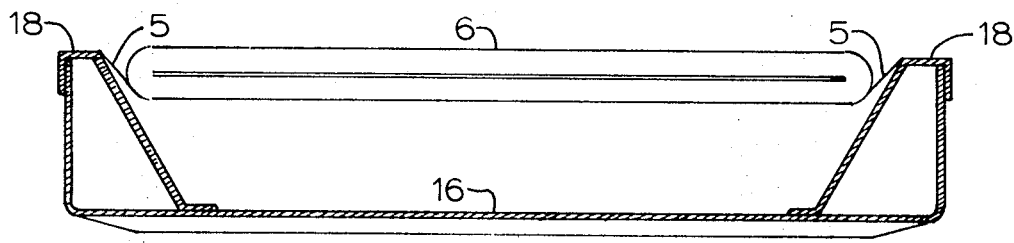
FIG. 5 is a cross-sectional view of the bunk frame equipped as in FIG. 3 wherein the bunk frame parts are fashioned from sheet metal.
Figure 6:
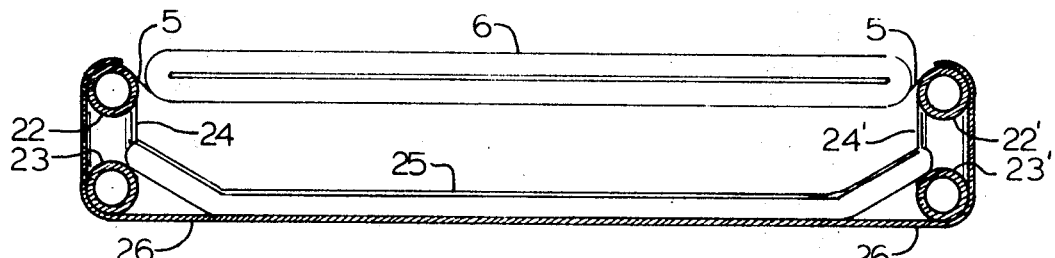
FIG. 6 is a cross-sectional view of the bunk frame equipped as in FIG. 3 wherein the bunk frame structure is fabricated from tubular metal pieces and provided with a light, non-structural covering.

The bunk frame units 2 and 2' may be constructed of any suitable material such as metal, wood or plastic and in a variety of ways as shown, for instance, by FIGS. 3–6. FIG. 3 shows in cross-section a bunk frame unit made from formed channel beam sides 8 and 8' secured to a bottom panel 10 of plywood, Masonite, or metal by appropriate fastenings. FIG. 4 shows a bed frame unit wherein the sides and bottom (designated as 12) are molded of fiber glass or plastic and the sides are internally reinforced by wooden sections 14 and 14'. Another type of bunk frame is shown in FIG. 5 wherein the base shell 16 of the bed frame unit is stamped, die-pressed, or folded on sheet metal of appropriate strength and thickness. The bottom of th shell 16 may be ribbed, if desired, for added strength. The upper element 18 is affixed to the bottom shell 16 by suitable means such as spot welding along points of contact. FIG. 6 shows yet another type of bed frame unit made up on tubular side rails 22, 22', 23 and 23' fastened together by vertical bracing 24 and 24', and by horizontal cross-bracing 25. A light, non-structural cover 26 of metal or plastic encases the load-bearing frame.

FIGS. 7, 8 and 9 illustrate a hinge-like system, designated generally as 27, for joining together the bottom of bunk frame units 2 and 2', thus supporting the bunk frame in open position. The hinge system is composed of mating units 29 and 31 positioned on the bottom edges of units 2 and 2', respectively. Each mating unit contains a plurality of rod-receiving elements 29a and 31a which are spaced from each other so that on mating at the units 29 and 31, a rod-receiving opening 30 is formed as shown in FIG. 7. Insertion of a rod 33 into the aligned rod-receiving opening of the hinge system unites the bunk frame units 2 and 2', thereby preventing the structure from collapsing at the center. Closing of the bunk frame is accomplished by first removing rod 33 and folding frame unit 2 onto frame unit 2' as shown in FIG. 8. When the frame units are closed in this manner, space is provided both between the folded bed surface 5 and the bottom of the bunk frame unit 2', and between the folded bed surface 5 and the bottom of the bunk frame unit 2 (which in the closed position constitutes the top of the closed units). These spaces may be used for storage of the tent canopy, the legs and other appurtenances to be described. The opening existing at the hinged end when the frame unit 2 is folded onto frame unit 2' may be provided with a suitable end plate 35 having a plurality of rod-receiving elements 37 which mate with the spaced rod-receiving elements 29a and 31a. The end plate 35 is secured in place by means of inserted rods 39 and 41 as shown in FIG. 9. The folded bunk frame units may be further secured in closed position by providing the end opposite the hinged end with suitable fastening means such as hooks (not shown). In the closed positions, the apparatus may be transported by means of a pair of handles 43.

Leg systems of the invention and their various embodiments will now be described with reference to FIGS. 10–15. The description will be directed to the leg system at one end of the bunk frame, but it should be understood that a similar leg arrangement is present at the other end of the bunk frame.

Referring to FIG. 10, leg guides 78 and 79 each having a top threaded portion (not shown) are inserted into respective leg sockets of the bunk frame unit 2. Leg guide securing rings 82 and 83 are screwed on top threaded portion of each leg guide. A raised collar (not shown) on each leg guide abuts against the lower surface of the frame unit 2 thus permitting the leg guide to be firmly fixed in the unit by tightening of guide securing rings 82 and 83. Alternatively, the leg guides may be secured in the leg sockets by any convenient and effective means such as set screws, locking pins, detents, clamps, locking slots, interrupted screws or by direct threading into the sockets.

Leg brace generally designated as 80, preferably composed of side bars 80a and 80a' interconnected with cross tube section 80b, is fitted with leg clamps 90 and 91 through which it is free to rotate. Leg clamps 90 and 91 fit over the lower ends of leg guides 78 and 79, respectively, and the ends of leg brace 90 are secured to each side of the bunk unit, for instance, as by a leg brace securing screw (shown as 93 on one side). Alternatively, the leg braces may be secured to the bunk frame unit by any suitable fastening means such as locking pins, bolts, wing nuts, knurled nuts, slot-indents and the like. Optionally, cross-corner or diagonal bracings (not shown) may be added to the leg braces to increase the rigidity of the structure. The leg brace 80 contains clamp securing nut means (shown on one side as 94) adjacent each to leg clamps 90 and 91.

To assemble the leg support system, legs 96 and 97 are inserted, respectively, through leg guides 78 and 79. The lower ends of the leg guides 78 and 79 are split so that tightening of the clamp securing nut 94, for instance, compresses leg guide 78 against the leg 96, and tightening the opposing securing nut compresses leg guide 79 on leg 97, thereby holding the legs at any desired vertical position with respect to the horizontal bunk frame. In this manner, each of the legs may be individually slidably adjusted and set to any desired height, thereby permitting the bunk frame to be levelled on irregular or sloping terrain. To permit storage in one-half the bunk frame, the legs should be approximately one-half the bunk frame in length. The maximum range of adjustability of slidably adjustable legs is equal to the length of the leg less the distance inclued in and between any bracing. Ordinarily, the range of adjustability will be 0 to at least 18 inches.

Figure 11:
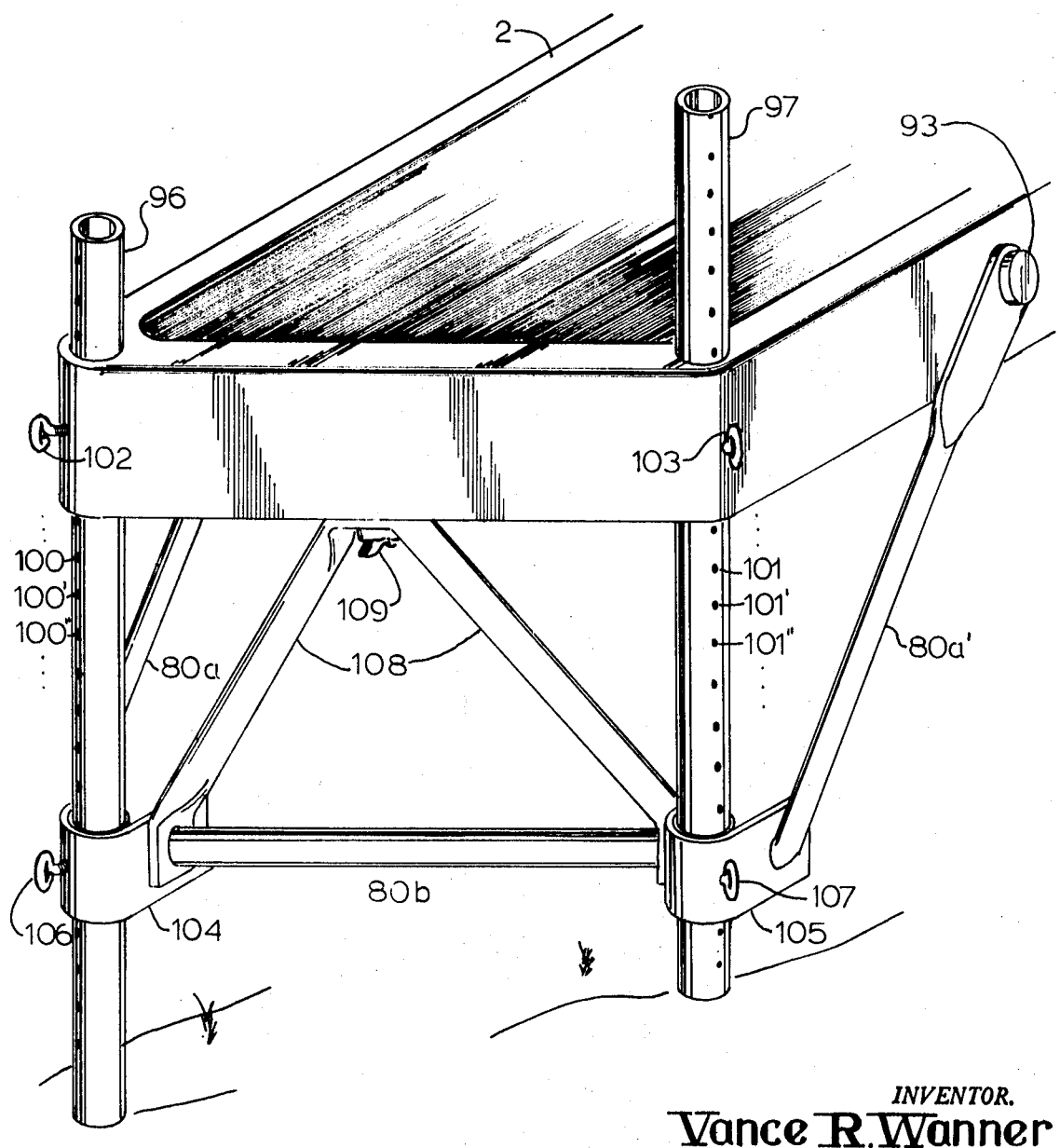
FIG. 11 is a perspective end view of the bunk frame with another type of slidably adjustable leg system.

FIG. 11 shows an alternative leg support system also embodying individually slidably adjustable legs. In this system, legs 96 and 97 are each provided with a row of equally spaced holes 100, 100', 100'', etc. and 101, 101', 101'', etc. drilled through each leg. Corner securing pins 102 and 103 fit through holes 51 and 52, respectively (see FIGS. 1 and 2) in the corners of the bunk frame and through one of the selected holes, 100 and 101 for instance, in the legs 96 and 97, respectively, thus individually fixing leg height with respect to the frame. Leg brace 80 is provided with leg guides 104 and 105 which fit over legs 96 and 97, respectively, and are secured thereto in place by lower leg securing pins 106 and 107, respectively, which likewise pass through mating holes 100''' and 101''', for instance. An end brace 108 fits over cross tube section of leg brace 80 and secures to the underside of bunk frame unit 2 by means of wing screw 109. Leg brace 80 is secured to the bunk frame unit 2 by leg brace securing screws (shown as 93 on one side).

The apparatus is assembled by first securing the leg brace 80 to the bunk frame unit 2 by means of the leg brace securing screws, 93 for instance. The end brace 108 is then secured to the bunk frame unit 2 by means of wing screw 109. Leg 96 is then inserted through hole 45 in the bunk frame unit and through leg guide 104 to a selected bunk height at which time corner pin 102 is inserted in place in the bunk frame hole 51 and lower leg securing pin 106 is inserted in leg guide 104. Next, leg 97 is inserted down through hole 46 in the bunk frame unit and through leg guide 105 to such length as the bunk frame is level when the leg is on the ground. At this time, corner pin 103 is inserted through leg guide 105 and through mating hole 101''', for instance, in leg 97. This procedure is repeated for the remaining legs of the bunk frame.

In order that the leg brace system lie flat for storage between the bunk frame and the folded bedding during transport, leg brace 80 is free to pivot in leg guides 104 and 105, respectively. Likewise, end brace 108 is free to pivot on the horizontal portion of leg brace 80.

Any suitable fastening means may be substituted for those described in FIG. 11. Also, alternatively, the holes 100, etc., 101, etc. in legs 96 and 97 need not be drilled all the way through the leg. They may be omitted entirely as when suitable screw or clamp pressure is used to hold the legs fixed with respect to the bunk frame, or to the leg clamps or to both. Also, pawl and ratchet means may be suitable for securing the legs to the bunk frame unit and/or to leg guides at selected heights. In such cases, the slidable legs will be appropriately fabricated with notches or ratchet mechanisms to properly engage the pawls.

In both leg systems described above, the movable legs may be fabricated of any suitable material such as wood, fiber glass or metal and may alternatively be fitted on their lower end with removable or replaceable points for use on firm ground as is shown in FIG. 12, or the removable points may be additionally provided with disc members as shown in FIG. 13 for use in mushy ground or sand. Additionally, although the legs illustrated in the drawings are circular in form, they may be likewise fabricated in any desired shape including oval, square, rectangular, triangular, H, I, T shapes as well as in any of the customary formed or extruded shapes commonly used for such columnar support. In such event, the leg sockets, leg guides, and leg clamps are all shaped to receive the legs used.

Figure 14:
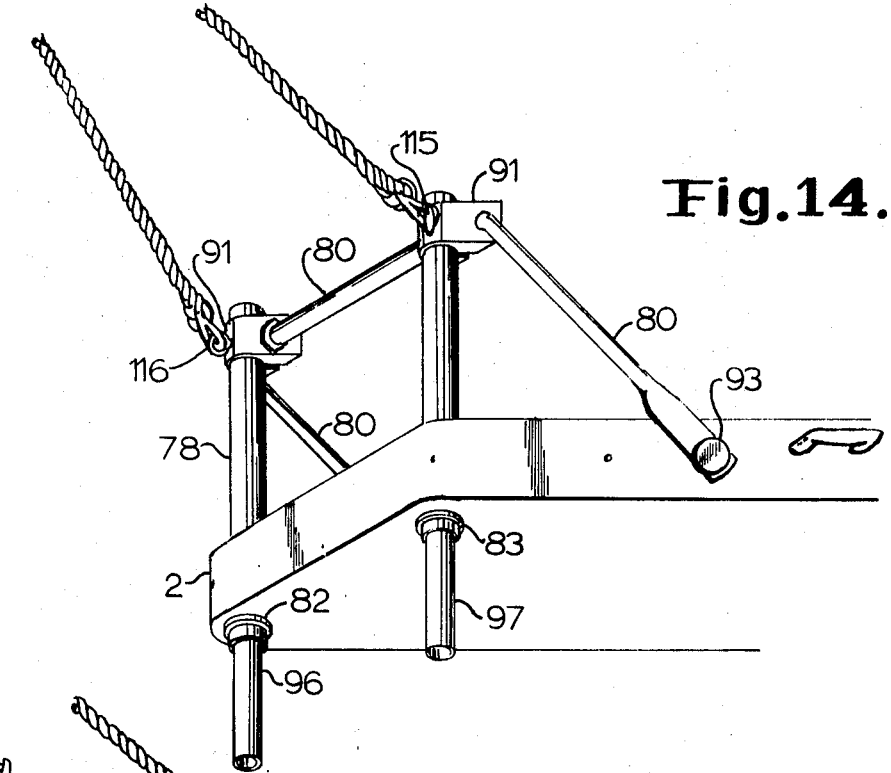
FIG. 14 is a perspective view of the leg system of FIG. 10 attached in inverted position to the bed frame for suspended support.
Figure 15:
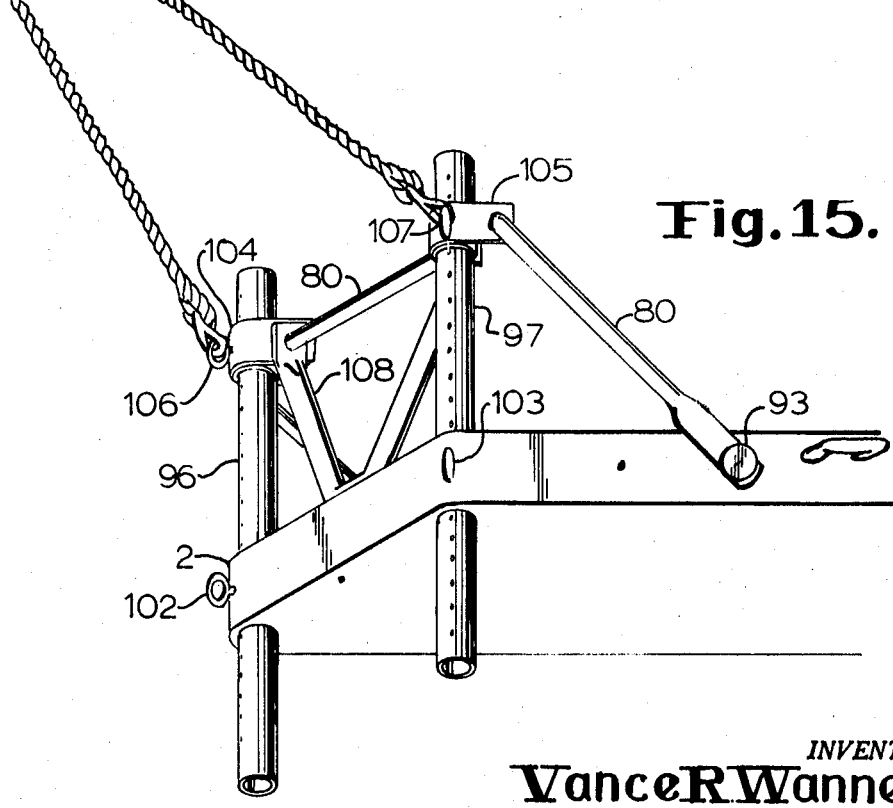
FIG. 15 is a perspective view of the leg system of FIG. 11 attached in inverted position to the bed frame for suspended support.

The described bunk frame and leg pieces of FIGS. 10 and 11, by alternate inverted assembly, may be used to provide a stable suspension system for suspending the bunk by rope, chain, wire or like means from between two trees or other vertical supports as illustrated in FIGS. 14 and 15. Referring to FIG. 14, the leg guides 78 and 79 are inserted upside down in the leg socket holes 45 and 46, respectively, and the leg guide securing rings 82 and 83 are screwed on them from beneath the bunk frame. The leg brace 80 along with leg clamps 90 and 91 are slipped over the top of leg guides 78 and 79 and secured to the bunk frame as before by leg brace securing screws, 93 for instance. Slidable legs 96 and 97 are inserted in a leg-up position and leg clamps 90 and 91 are tightened by leg clamp securing nuts (shown on one side as 94) so that the suspension system is firmly secured. Screw eyes 115 and 116 are inserted in leg clamps 90 and 91 to provide securing points for suspension lines or ropes as shown.

FIG. 15 illustrates the bunk-support arrangement of FIG. 11 similarly assembled in the inverted position for suspending the bunk from trees or other suitable vertical supports.

Figure 19:
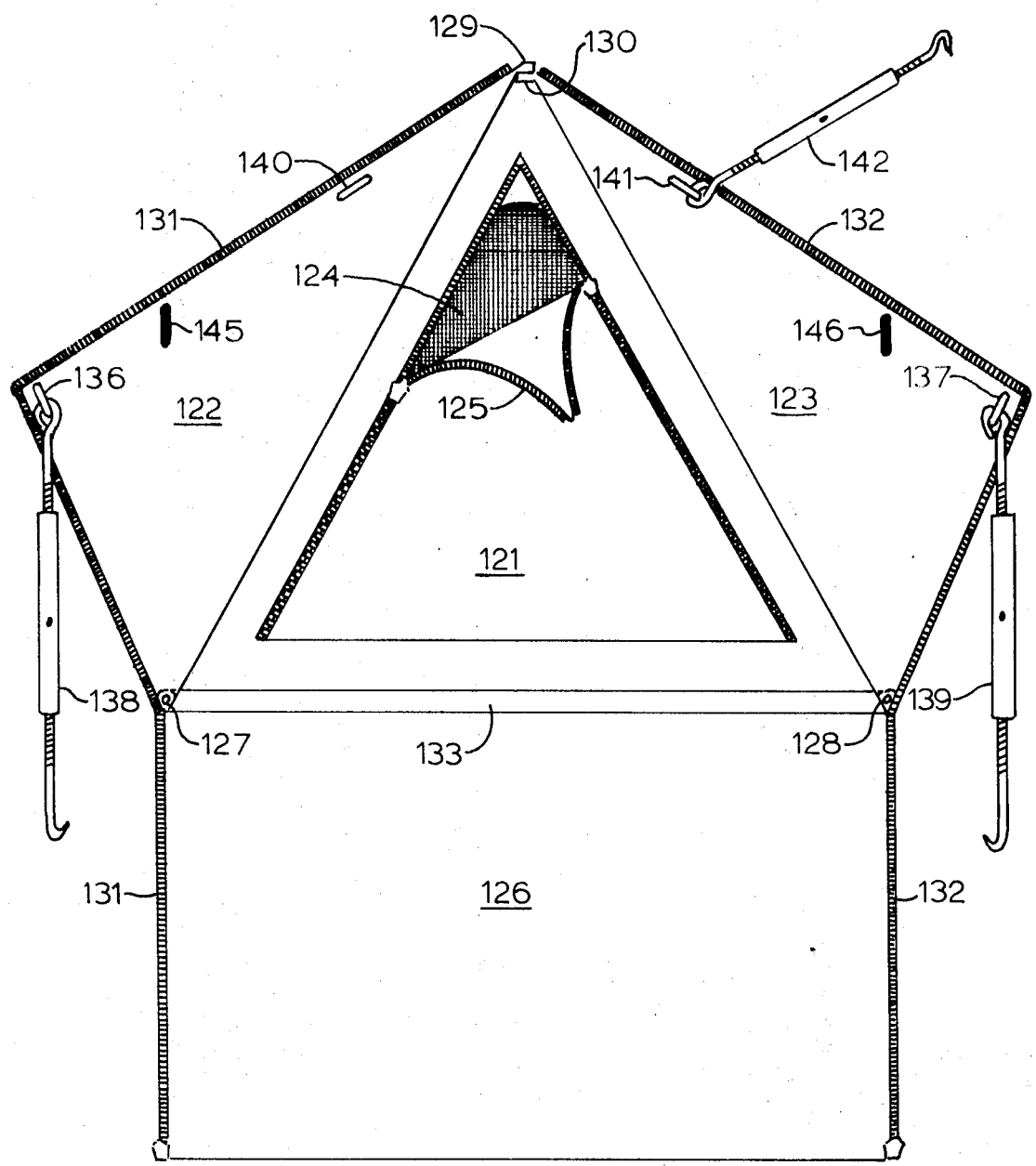
FIG. 19 is a flat (unfolded) plan view of the bunk-tent end section.

Referring to FIGS. 16–20, the tent canopy of the bunk-tent combination comprises two identical end sections indicated generally as 118 and 119, which are affixed on and over the head and/or foot of the bunk frame, and a center section 120 is fastened to the two end sections forming the overhead cover of the tent canopy. FIG. 19 shows the layout of an end section basically fabricated of tenting fabric of appropriate mesh and weight for the intended environment. Each end section comprises a middle panel 121 and two adjoining side triangular panels 122 and 123, the latter panel reinforced with, for instance, plywood, Masonite, sheet metal, plastic or the like which are affixed in place on the basic fabric by any convenient means such as tacking, adhesion, sewing, etc. The middle panel 121 angles away from the bunk frame to which it is affixed, i.e. forms an internal angle between its internal surface and the horizontal plane of the bunk frame of greater than 90 degrees up to about 120 degrees, preferably about 105 to 110 degrees. Each of the side triangular panels 122 and 123 lies in a plane perpendicular to the horizontal plane of the bunk frame and is turned inwardly to establish a geometric angle between the extended planes of the panels which permits a number of similar bunk-tent units to be assembled without gaps in novel polygonal arrangements discussed below. This angle may vary depending upon the number of bunk units to be included in the formation of a regular closed polygon such as a pentagon, hexagon and the like. This angle may be readily determined by the formula $$A = \frac{n-2}{n} \times 108$$

wherein A is the angle and $n$ is the number of guides in the polygonal. For instance, in the case of a hexagon, the angle will be approximately 120 degrees. The angle between the inner surface of the middle panel and the inner surface of each of the side panels is about 140 to 160 degrees, preferably about 150 degrees. If desired, middle panel 121 may be provided with a screen 124 together with a zip-on cover 125 for said screen. Advantageously, the end section also contains a skirt 126. Triangular panel 122 is fitted at its lowest corner with an eye 127 and triangular panel 123 is similarly fitted with an eye 128. These eyes are used to secure the end piece assembly to the bunk frame unit 2 by means of securing pins 102 and 103 which are preferably threaded into the bunk frame at an angle of approximately 30 degrees to the long axis of the frame so that the angle between the plane of panel 122 and that of panel 123 in the erected position will be approximately 120 degrees as in FIG. 18.

Eyelets 129 and 130 (shown in more detail in FIG. 21) join the uppermost tips of triangular panels 122 and 123.

Along the periphery of the end section, zippers 131 and 132 or similar fastenings are provided for joining and closing the tent sections. If desired, a narrow strip of elastic (not shown) may be sewn between the fastenings and the fabric of the end section to absorb local stresses which may develop between the tent sections.

Threaded through a suitable fold 133 in the middle panel 121 is a piece of wire or rope (not shown) which is attached to the eyes 127 and 128. When the end section is assembled on the bunk frame, the wire or rope draws the fabric in snugly against the bunk frame.

Pad eyes 136 and 137, respectively, are fitted to panels 122 and 123 for turnbuckle hooks 138 and 139, respectively, for hooking the end piece to the bunk frame. Pad eyes 140 and 141 are provided in panels 122 and 123 along with turnbuckle hook 142 for the purpose of providing necessary form and rigidity to the end section structure when assembled on the bunk frame. Small slits 145 and 146 are cut through panels 122 and 123 for the purpose of permitting suspension eyes, 106 and 107 for example, to protrude to the outside of the tent canopy when the apparatus is rigged for overhead suspension as in FIG. 23.

Figure 20:
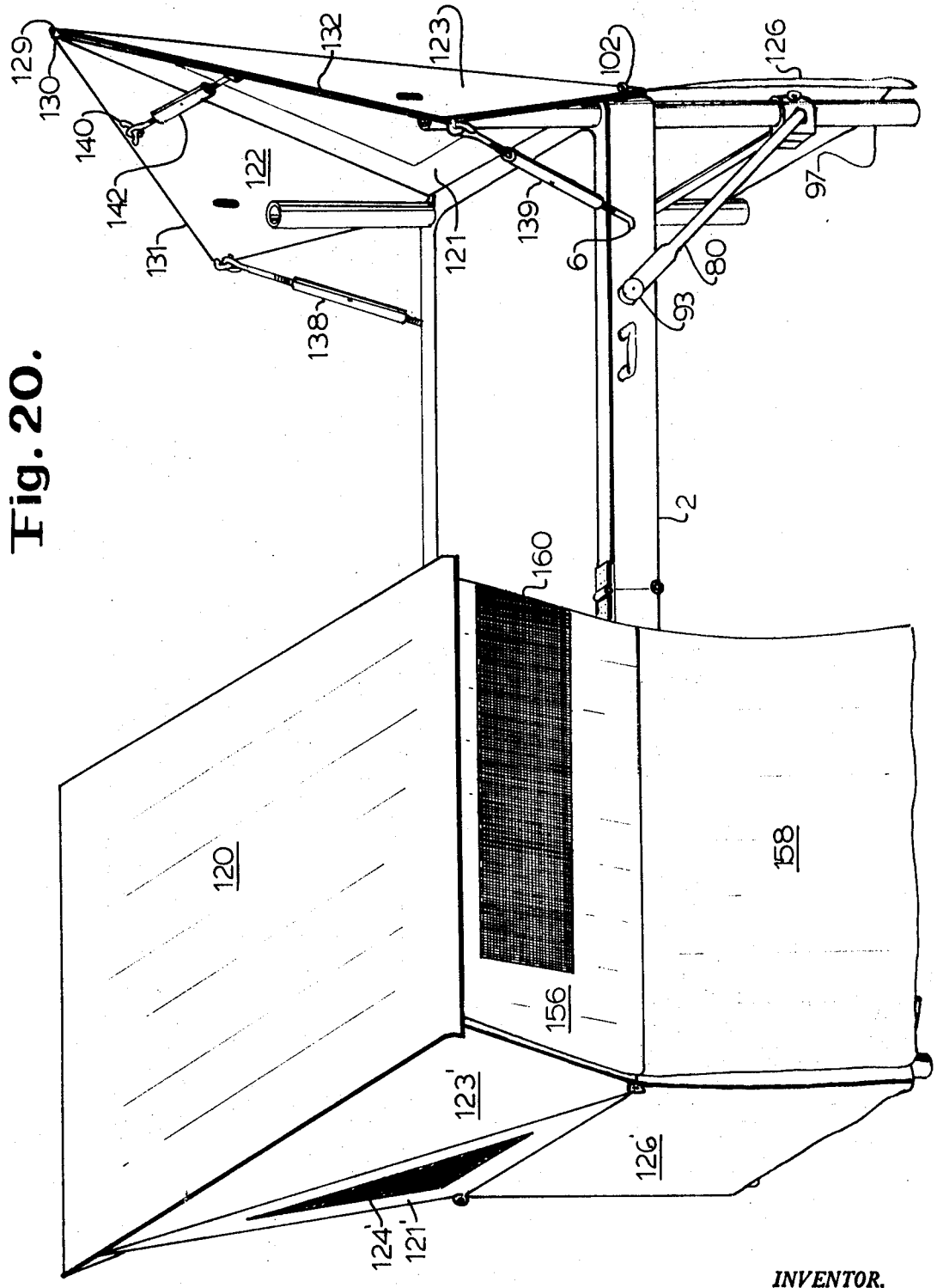
FIG. 20 is a perspective view, partially cut away, of an assembled bunk-tent combination.

The center section 120 of the tent canopy shown in FIGS. 17, 18 and 20 consist of a top panel, two side panels (156, for example), and two skirt panels (158, for instance) which are sewn together in one assembly. The side panels (156, for example) may be fitted with fabric screen windows (160, for instance), preferably with internal covering piece (not shown), capable of being unzipped to admit light and air as desired by the occupant. The side and skirt panels are cut sufficiently full so that a person may stand alongside the bunk, yet be included within their drape. A drawstring or other suitable fastening (not shown) is provided to draw the side panels in against the bunk frame when desired to exclude insects, etc.

FIG. 20 shows an end section assembled on the bunk frame. End piece securing pins (102, for instance) are run through their eyelets and into the bunk frame. Turnbuckle hooks 138 and 139 are then placed in their appropriate holes (6, for instance) of the bunk frame. Turnbuckle hook 142 is hten hooked into pad eye 140 and the turnbuckles are set up to remove most of the looseness.

This procedure is repeated for the opposite end section.

Figure 21:
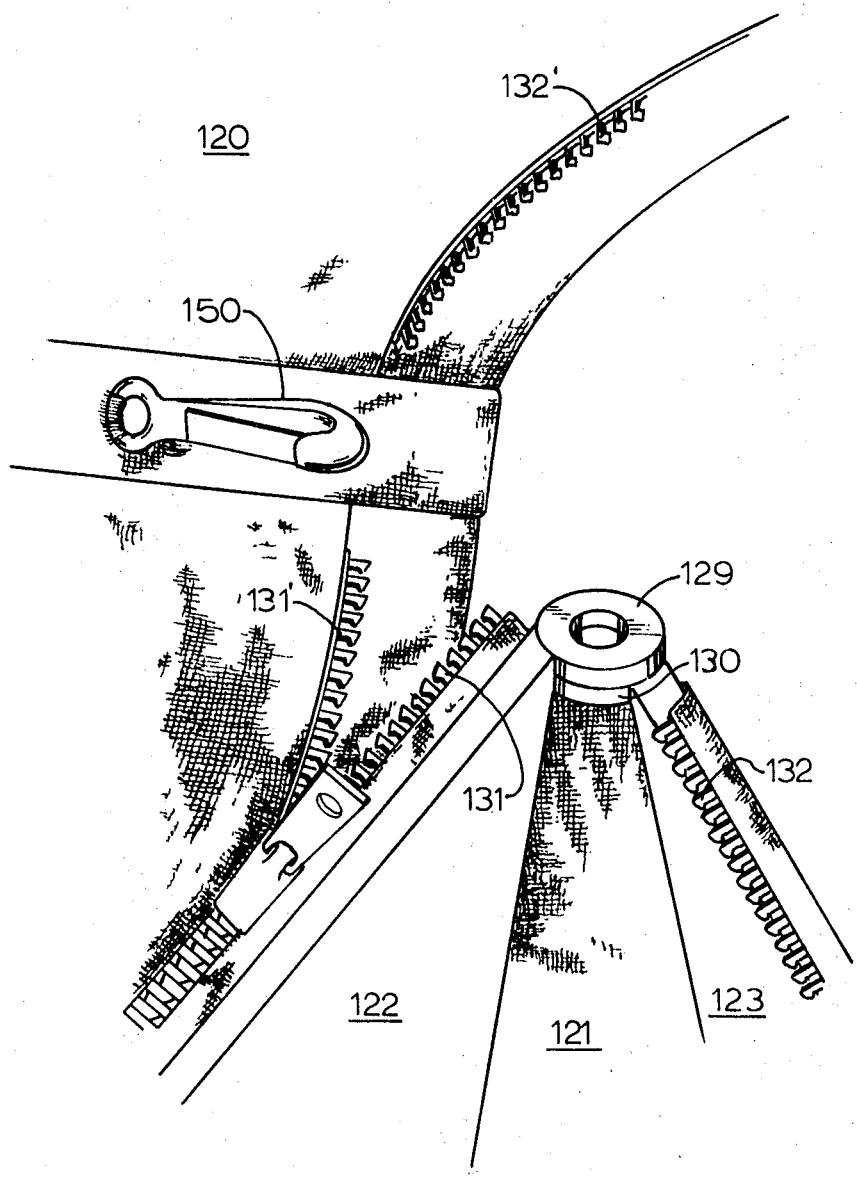
FIG. 21 is a perspective view of a preferred means for attaching the top canopy piece of the end canopy piece.

FIG. 21 shows the detail for securing the center section of the tent canopy 120 to the end section 119 in the vicinity of the peak corner 153 (see FIG. 8). Eyelet 129, a fixed part of triangular panel 122, is then placed over eyelet 130, a fixed part of triangular panel 123. Tent center section 120 is set in place over the bunk and snap hook 150, attached thereto, is run through both eyelets 129 and 130, thus pinning the triangular panels 122 and 123 and the tent center section 120 together at that point (153). Zippers 131–131′ and 132–132″ are mated so that tent center section 120 is secured to the tent end section along its edges.

This procedure is repeated at the opposite end section and remaining slack is taken out of the turnbuckles.

The bunk-tent combination may be assembled in a variety of different ways. FIGS. 16, 17 and 20 show the single bunk; leg supported. FIG. 22 shows the double bunk in tandem; leg supported. FIG. 23 shows the single bunk; suspension supported. In the tandem arrangement (FIG. 22) two bunk frame units designated generally in phantom lines as 202 and 204 are placed one above the other and each of the four legs are inserted through the coincident sockets provided at the corners of the bunk frames. Leg braces, shown as 286 and 286′, are provided to secure and support the upper bunk frame 202. Utilization of leg braces (not shown) on the lower bunk is optional. The tent canopy is similar to that described for the single bunk-tent combination above except that the additional screen areas 161 are provided for the lower bunk area. The end section skirts and center section side tent panels may be made longer to accommodate the taller tandem arrangement.

FIG. 23 shows the inverted arrangement of FIG. 14 having attached thereto the tent canopy in a manner like that described above.

Figure 24:
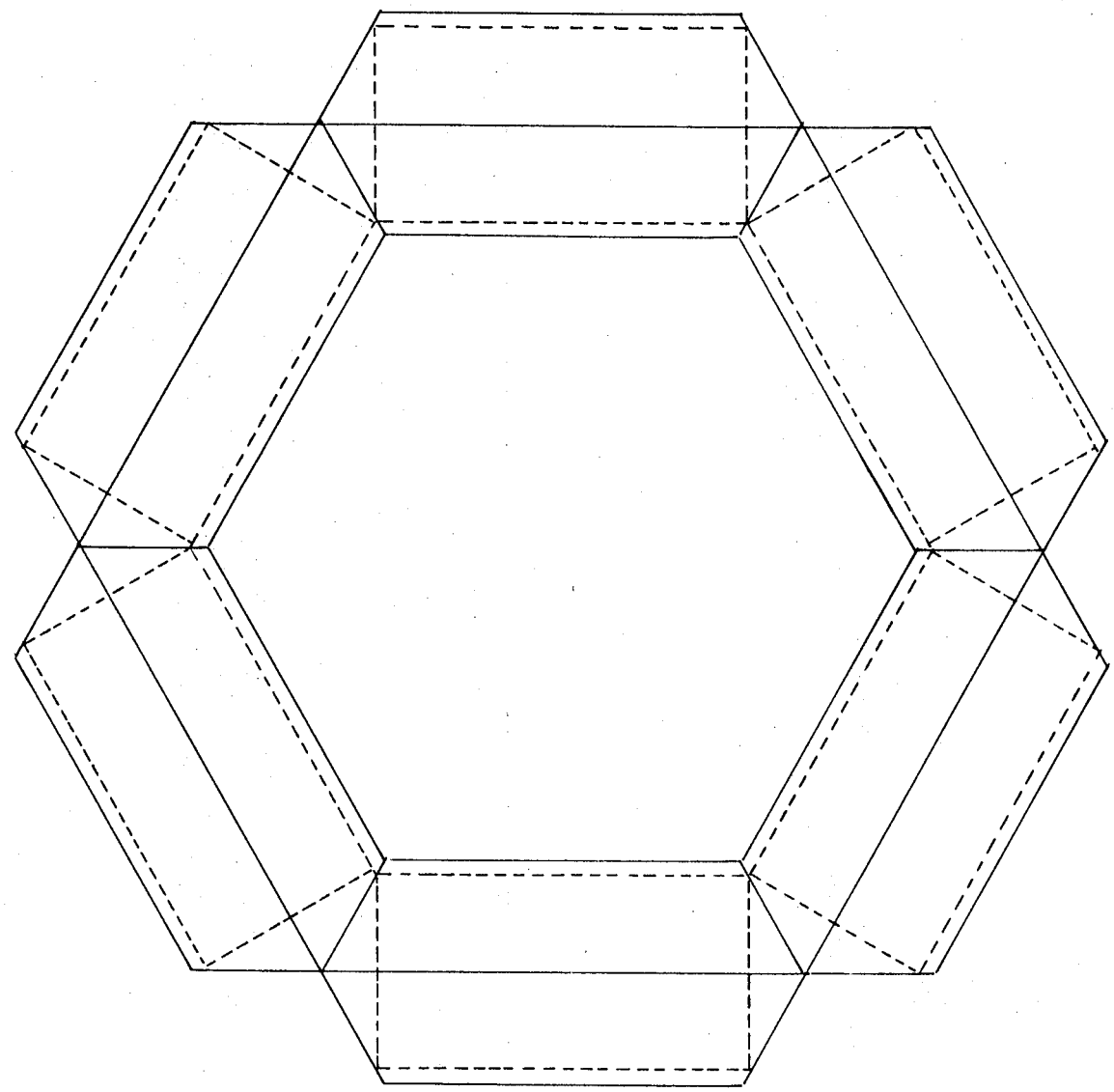
FIG. 24 is a plan view of a number of bunk-tent combinations assembled together to form an enclosure.

The geometry of the tent canopy permits numbers of the bunk-tent combinations to be joined in novel and useful arrangements. Six of such bunk-tent combinations may be arranged in a hexagonal fashion, shown in FIG. 24, to provide an enclosed area for group protection or privacy. If desired, the hexagonal grouping may be fitted with a circular tarpaulin or fly for further privacy and protection from sun and rain. One or more of the bunk beds may be, of course, omitted from the hexagonal group for easy entry to the center.

It is claimed:

1. A bunk-tent combination comprising a bunk frame, legs for said bunk frame and a tent canopy removably attached to said bunk frame, said tent canopy comprising tent end sections and a tent center section, each of said tent sections comprising a triangular middle panel flanked by adjoining reinforced triangular side panels, said middle panel forming an internal angle with the horizontal plane of the bunk frame of greater than 90 degrees up to about 120 degrees, said triangular side panels lying in planes perpendicular to said horizontal plane.

2. The combination of claim 1 wherein the internal angle is about 105 to 110 degrees.

3. The combination of claim 1 wherein the bunk frame is a foldable shallow, box-like structure.

4. The combination of claim 1 wherein the bunk frame is provided with a bunk surface.

5. A bunk-tent combination comprising a foldable bunk frame provided with slidably adjustable legs for said bunk frame, a tent canopy removably attached to said bunk frame, said tent canopy comprising a pair of self-supporting tent end sections each comprised of a rigid triangular middle panel flanked on each side with adjoining triangular reinforced, rigid side panels, said tent end sections being attached at the head and foot of said bunk frame, and a tent center section removably fastened to said end sections.

6. The combination of claim 5 wherein the triangular middle panel is an equilateral triangle.

7. The combination of claim 5 wherein the triangular middle panel forms an internal angle with the horizontal plane of the bunk frame of greater than 90 degrees up to about 120 degrees.

8. The combination of claim 7 wherein the angle is about 105 to 110 degrees.

9. The combination of claim 7 wherein each of the triangular side panels angle inwardly permitting arrangement of a number of said bunk-tents into the form of a regular closed polygon.

10. The combination of claim 9 wherein the angle between the extended planes of the triangular side panels is about 120 degrees.

11. The combination of claim 5 wherein the reinforced triangular side panels extend beyond the vertical plane of each of the bunk frame sides.

12. The combination of claim 11 having means for fastening each of the triangular side panels to the sides of the bunk frame.

13. A bunk-tent combination comprising a suitcase-like bunk frame, said bunk frame being comprised of a first and second portion, each of said portions having a base and three upright sides, hinge means operably connecting said first and second portions into a shallow, box-like frame structure which forms a rigid bunk frame and enabling folding of one of said portions onto the other portion, leg receiving means at each corner of said bunk frame when in open position and means fixing said shallow box-like bunk frame structure into open position, said fixing means comprising a hinge-like system composed of mating units, the respective members of which are positioned on the bottom of the base edges to be joined of the respective first and second bunk portions, each of said units containing rod-receiving elements spaced apart from each other so that on mating of the units a rod-receiving opening is formed, and a rod for insertion in said rod-receiving opening, slidably adjustable legs for said leg receiving means and a tent canopy removably attached to said bunk frame.

14. The bunk tent combination of claim 13 wherein the leg receiving means extend through the bunk frame and the legs are inserted into each of said leg-receiving means so as to extend substantially above the bunk frame surface, means securing said legs to said bunk frame and means on each of said legs above said bunk frame surface for suspending the bunk.

References Cited
UNITED STATES PATENTS

| | | | |
|---|---|---|---|
| 2,071,644 | 2/1937 | McBrady | 190—2 |
| 2,516,869 | 8/1950 | Harris | 135—1 |
| 3,356,098 | 12/1967 | Krutzikowsky | 135—1 |

BOBBY R, GAY, Primary Examiner

A. M. CALVERT, Assistant Examiner

U.S. Cl. X.R.

190—2; 135—1